(12) United States Patent
Subburaj et al.

(10) Patent No.: US 10,101,438 B2
(45) Date of Patent: Oct. 16, 2018

(54) NOISE MITIGATION IN RADAR SYSTEMS

(71) Applicant: Texas Instruments Incorporated, Dallas, TX (US)

(72) Inventors: Karthik Subburaj, Bangalore (IN); Karthik Ramasubramanian, Bangalore (IN); Sriram Murali, Bangalore (IN); Sreekiran Samala, Plano, TX (US); Krishnanshu Dandu, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 529 days.

(21) Appl. No.: 14/687,617

(22) Filed: Apr. 15, 2015

(65) Prior Publication Data

US 2018/0074168 A1    Mar. 15, 2018

(51) Int. Cl.
    *G01S 7/292*      (2006.01)
    *G01S 7/41*      (2006.01)

(52) U.S. Cl.
    CPC .............. *G01S 7/292* (2013.01); *G01S 7/414* (2013.01)

(58) Field of Classification Search
    CPC ...... G01S 13/931; G01S 13/345; G01S 13/34; G01S 7/354; G01S 13/343
    USPC ........................................................ 342/128
    See application file for complete search history.

(56) References Cited

U.S. PATENT DOCUMENTS

| | | | | |
|---|---|---|---|---|
| 4,346,774 A | * | 8/1982 | Hirota | B60R 16/0237 180/167 |
| 7,304,601 B1 | * | 12/2007 | Edvardsson | G01F 23/284 342/118 |
| 7,671,720 B1 | | 3/2010 | Martin et al. | |
| 9,312,898 B2 | * | 4/2016 | Wagner | H04B 1/12 |
| 2003/0020544 A1 | * | 1/2003 | Behzad | H01F 17/0006 330/254 |
| 2005/0179585 A1 | | 8/2005 | Walker et al. | |
| 2007/0247351 A1 | | 10/2007 | Falk | |
| 2009/0033538 A1 | | 2/2009 | Winkler | |

(Continued)

FOREIGN PATENT DOCUMENTS

EP      1681578 A1      7/2006

OTHER PUBLICATIONS

European Search Report, 167806518, dated Mar. 29, 2018 (7 pages).

*Primary Examiner* — Timothy A Brainard
(74) *Attorney, Agent, or Firm* — Ebby Abraham; Charles A. Brill; Frank D. Cimino (57) ABSTRACT

A noise-mitigated continuous-wave frequency-modulated radar includes, for example, a transmitter for generating a radar signal, a receiver for receiving a reflected radar signal and comprising a mixer for generating a baseband signal in response to the received radar signal and in response to a local oscillator (LO) signal, and a signal shifter coupled to at least one of the transmitter, LO input of the mixer in the receiver and the baseband signal generated by the mixer. The impact of amplitude noise or phase noise associated with interferers, namely, for example, strong reflections from nearby objects, and electromagnetic coupling from transmit antenna to receive antenna, on the detection of other surrounding objects is reduced by configuring the signal shifter in response to an interferer frequency and phase offset.

21 Claims, 5 Drawing Sheets

(56) References Cited

U.S. PATENT DOCUMENTS

| | | | |
|---|---|---|---|
| 2009/0121918 A1* | 5/2009 | Shirai | G01S 7/023 |
| | | | 342/159 |
| 2010/0204867 A1 | 8/2010 | Longstaff | |
| 2011/0037642 A1 | 2/2011 | Stove | |
| 2013/0102254 A1* | 4/2013 | Cyzs | H04B 1/126 |
| | | | 455/63.1 |
| 2013/0322362 A1 | 12/2013 | Benjebbour et al. | |

* cited by examiner

NOISE MITIGATION IN RADAR SYSTEMS

BACKGROUND

Radar systems rely on signal analysis to detect the presence of information in a received radar signal. The ability to detect such information is decreased by the presence of noise in the received radar signal. Such noise includes amplitude and phase noise introduced into the transmitted radar wave by the transmitter of the radar as well as amplitude and phase noise introduced into the mixer of the receiver of the radar. Integrated circuits (e.g., manufactured using CMOS—complementary-type metal on silicon—transistors) are used to increase the functionality and portability of many radar systems. However, radar systems using integrated circuits based on CMOS technology often include high amounts of noise, which reduces the sensitivity of such radar systems.

SUMMARY

The problems noted above can be addressed in a noise-mitigated continuous-wave frequency-modulated (CWFM) radar that includes, for example, a receiver for receiving a reflected radar signal and a mixer for generating a baseband signal in response to the received reflected radar signal and in response to a local oscillator (LO) signal. In one embodiment, the baseband signal is generated in response to the received reflected radar signal and is signal shifted by a frequency offset and phase offset of an interferer, where the interferer is a portion of the received radar signal including strong reflections, for example, caused by a nearby reflector reflecting the transmitted radar signal. The real portion and/or the imaginary portion of the frequency-shifted baseband signal is further processed to detect the presence and position of objects surrounding the radar. Accordingly a near object can be a radar-signal reflecting object that is substantially stationary with respect to the receiver antenna (and/or CWFM system itself) and/or for which a radar-return signal is not desired.

In another embodiment, the transmitted radar signal is signal shifted by the frequency offset and phase offset of the interferer, and the received radar signal is further processed to detect the presence and position of objects surrounding the radar. In such embodiments, the amplitude noise or phase noise skirt associated with the interferer is reduced and the accuracy and sensitivity of detection of surrounding objects' presence and position by the noise-mitigated continuous-wave frequency-modulated radar is enhanced compared to conventional apparatus and methods.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or a direct electrical connection. Accordingly, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as periodic waveforms. The term "transceiver" includes the meaning of transmitter and receiver, where the transmitter and receiver are independently operable of each other (e.g., both can be on, either can be on, and both can be off during operation of the system that includes the transceiver).

Figure 1:
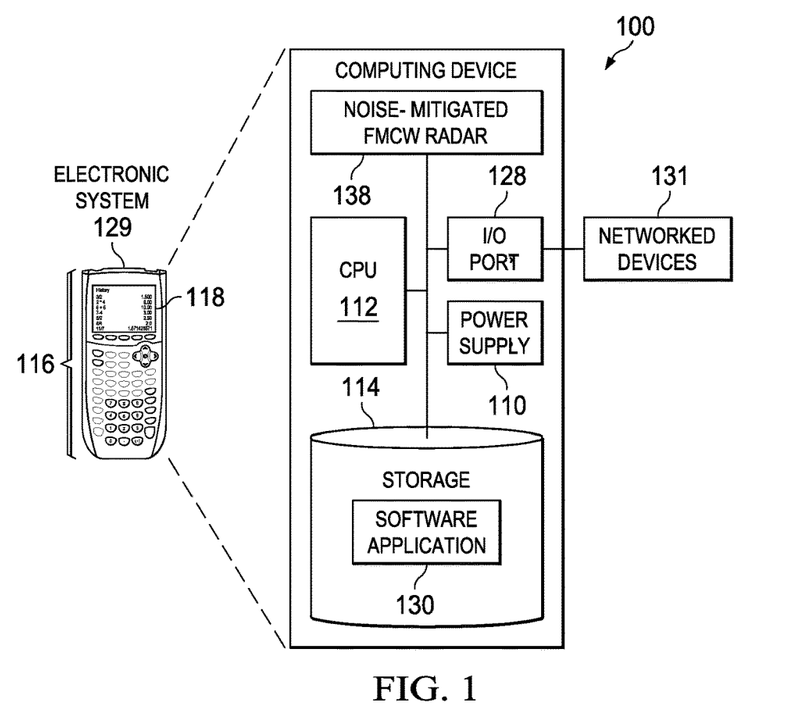
FIG. 1 shows an illustrative electronic device in accordance with example embodiments of the disclosure.

FIG. 1 shows an illustrative computing system 100 in accordance with certain embodiments of the disclosure. For example, the computing system 100 is, or is incorporated into, an electronic system 129, such as a computer, electronics control "box" or display, communications equipment (including transmitters), or any other type of electronic system arranged to generate radio-frequency signals.

In some embodiments, the computing system 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing system 100.

The CPU 112 comprises memory and logic that store information frequently accessed from the storage 114. The computing system 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device capable of point-to-point and/or networked communications with the computing system 100. The computing system 100 can also be coupled to peripherals and/or computing devices, including tangible, non-transitory media (such as flash memory) and/or cabled or wireless media. These and other input and output devices are selectively coupled to the computing system 100 by external devices using wireless or cabled connections. The storage 114 can be accessed by, for example, the networked devices 131.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing system 100 by external devices using or cabled connections. The CPU 112, storage 114, and power supply 110 can be coupled to an external power supply (not shown) or coupled to a local power source (such as a battery, solar cell, alternator, inductive field, fuel cell, capacitor, and the like).

The computing system 100 includes a noise-mitigated frequency-modulated continuous-wave (FMCW) radar 138. The noise-mitigated FMCW radar 138 includes a method and apparatus to reduce the presence and impact of noise that reduces the detectability of information in a radar signal. The disclosed noise-mitigated FMCW radar 138, for example, reduces amplitude and phase noise associated with transmitter-to-receiver coupling and/or near-object reflections, which improves detection of far objects and long-range performance. Accordingly, the long-range performance is optionally improved without higher power consumption, for example, of radio frequency (RF) components of the FMCW radar 138.

Figure 2:
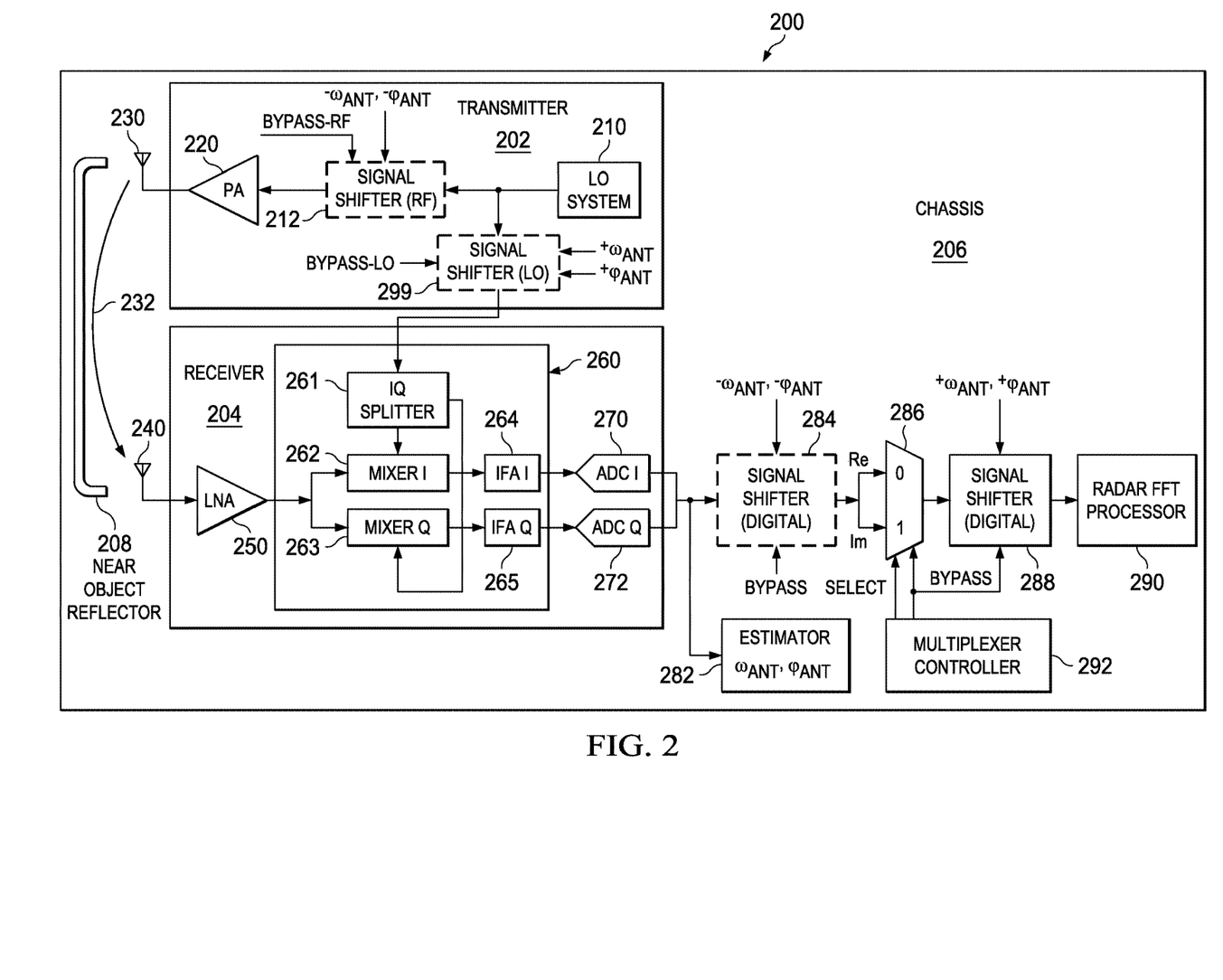
FIG. 2 is a block diagram of a noise-mitigated FMCW (frequency-modulated continuous-wave) radar system in accordance with embodiments of the disclosure.

FIG. 2 is a block diagram of a noise-mitigated FMCW (frequency-modulated continuous-wave) radar system in accordance with embodiments of the disclosure. Generally described, a noise-mitigated FMCW radar system 200 includes a transmitter 202, a receiver 204, an estimator 282, a DSP such as the radar FFT (fast Fourier transform) processor 290, and a shift controller 292. The noise-mitigated FMCW radar system is arranged to reduce (e.g., mitigate or suppress) the impact of at least one of amplitude noise and phase noise associated with an interferer signal.

In operation of the radar system 200 generally described, the estimator 282 is used to determine the value of the frequency and phase of an interferer signal at the ADC output. The interferer signal results from, for example, direct coupling of a signal transmitted by the transmission antenna 230 and received (e.g., directly) at the receiver antenna 240. (The direct coupling results, for example, from electromagnetic coupling between the two antennas.) The interferer signal may also refer to (a) strong reflection(s) (or near-object reflections) of the transmitted signal to the receiver antenna by known objects that are relatively close to the radar apparatus, such as the vehicle chassis behind (or in) which the radar apparatus is mounted.

Transmitter 202 includes an optional signal shifter 212 and an optional (LO) signal shifter 299. For convenience of discussion, the functionality of the signal shifter 212 is described below. The signal shifter 299 is more particularly discussed below, for example, with reference to FIG. 8. When the bypass signal (e.g., BYPASS-LO and/or BYPASS-RF) is asserted, the output of a given signal shifter is substantially the same as the input of the given signal shifter.

Signal shifters 212 and/or 284 are programmed to shift the spectrum of the transmitted signal and/or the spectrum of the received signal by the determined magnitude of the frequency and phase of the interferer signal. The output of the signal shifter 284 is generally referred to as the shifted baseband signal and the frequency and phase of the interferer signal after the signal shifts, while the output of the signal shifter 284 is referred to as the interferer-offset frequency and phase in the shifted baseband signal. (For example, the shifted baseband signal has a substantially zero frequency and phase that is substantially centered on a multiple of 90 degrees.) Shifting the spectrum by the frequency and phase of the determined magnitude of the interference (e.g., the interferer signal) causes the antenna coupling (or near-object reflection, whichever dominates) to be transformed to a DC signal (e.g., a direct-current signal of 0 Hz) at the output of the signal shifter 284. Accordingly, substantially all of the amplitude noise associated with the interferer signal is in the I-chain signal (e.g., the signal chain through components 262, 264, 270, and onwards), while the Q-chain signal is substantially devoid of such amplitude noise. Additionally, substantially all of the phase noise corresponding to the interferer is in the Q-chain signal (e.g., the signal chain through components 263, 265, 272, and onwards), while the I-chain signal is substantially devoid of such phase noise. The radar FFT processor 290 is operable to receive the Q-chain signal for further radar processing when the amplitude noise in the system dominates and is operable to receive the I-chain signal when the phase noise dominates.

The initial signal shifting is performed by the RF signal shifter 212, the LO signal shifter 299, and/or the digital signal shifter 284. The RF signal shifter 212, LO signal shifter 299, and the digital signal shifter 284 are "optional" components where, for example, at least one of the components is present. Where both the RF signal shifter 212 and the digital signal shifter 284 are present, the sum of the signal shifts of both the RF signal shifter 212 and the digital signal shifter 284 is equal to (for example) the signal shift of either the RF signal shifter 212 or the digital signal shifter 284 used singly. As described below, the signal shift is determined (e.g., during a calibration routine) by processing of a near-object reflected signal by the radar FFT processor 290. The signal shift is one of a frequency shift, a phase shift, or both.

The transmitter 202, the transmitter antenna 230, a receiver 204, the receive antenna 240, a DSP (such as the radar FFT processor 290), and a shift controller 292 are optionally mounted on the chassis 206 (e.g., of a vehicle, such as an automobile or a truck) or positioned within a relatively close proximity (e.g., a few centimeters) to the chassis 206. The chassis 206 includes a near-object reflector 208 (e.g., a vehicle bumper) that is also (e.g., in addition to the transmitter 202 and receiver 204) mounted to the chassis 206 such that the near-object reflector 208 causes reflections of transmitted radio waves. The near-object reflector 208 can be a radar-signal reflecting object that is substantially stationary with respect to the receiver antenna (and/or CWFM system itself) and/or for which a radar-return signal is not desired. The reflection of the transmitted radio waves by the near-object reflector 208 is detected and mitigated using calibration and operational routines in accordance with the disclosure herein. The chassis 206 optionally also refers to the protective housing or casing of the radar apparatus, which likewise typically reflects some of the transmitted signal directly (e.g., nearly directly) to the receiver.

The transmitter 202 includes an LO (local oscillator) system 210, a PA (power amplifier) 220, and a transmission antenna 230. The receiver 204 includes a receiver antenna 240, an LNA (low noise amplifier) 250, a mixer 260, and the in-phase (I) and quadrature (Q) ADCs (analog-to-digital converters) 270 and 272 (respectively). Optionally, the transmitter 202 and the receiver 204 are embodied as an integrated transceiver. In an embodiment, components of the noise-mitigated FMCW radar system 200 are assembled by forming the antennas on a printed circuit board and mounting one or more integrated circuits (in which the LO 210, transmitter 202, and receiver 204 are formed) on the printed circuit board.

In operation, the LO system 210 is operable to generate an LO output signal having a transmission frequency that is suitable for driving the input of the PA 220. As described below with reference to FIG. 3a and FIG. 3b below, the LO system 210 output signal has a frequency that varies over time. The LO system 210 output signal is, for example, a FMCW (frequency-modulated continuous wave) that begins a frequency sweep starting from a predetermined value (e.g. 77 GHz) and increases at a constant rate (e.g. 100 MHz/µs) for a predetermined duration (e.g. 20 µs). The LO system 210 output relatively quickly transitions from the highest frequency to the lowest frequency such that the frequency sweep is periodically repeated each interval of the predetermined duration. (In various embodiments, the frequency sweep optionally starts at a higher frequency, gradually descends in frequency until the lowest frequency is reached, and quickly returns to the highest frequency.)

The PA 220 is operable to receive the LO system 210 output signal of the transmission frequency from the LO system 210 (via the RF signal shifter 212, if present). In response thereto, the PA 220 typically amplifies the LO system 210 output signal. The amplified LO output signal is coupled to the transmission antenna 230, where the amplified LO output signal is transmitted as transmitted signal 232. The transmitted signal 232 is transmitted as a radio wave signal, which (in addition to reflections of the radio wave signal by one or more various surrounding objects desired to be detected and analyzed) is coupled to the receiver antenna 240 of the receiver 204. The coupling from transmit antenna to receive antenna is typically unintentional and undesired, as its presence in the signal received by the receiver makes it difficult for the circuits and processors using the receiver output to detect the presence and position of the surrounding objects desired to be detected and analyzed. The received radio wave signal is not an exact copy of the transmitted signal 232 reflected by the surrounding objects to be detected, due to, for example, unintentional and/or undesired electromagnetic (EM) interference or EM coupling between the transmission antenna 230 to and the receiver antenna 240.

The LNA 250 is operable to receive the received radio wave signal from the receiver antenna 240 and to amplify the received radio wave signal. The amplified received radio wave signal is coupled to the in-phase signal mixer (mixer I) 262 and the quadrature signal mixer (mixer Q) 263 of the mixer 260. The LO system 210 output signal is also coupled to the IQ (in-phase/quadrature) splitter module 261, which in response creates two signals LOI (local oscillator in-phase) and LOQ (local oscillator quadrature). The phases of LOI and LOQ are 90 degrees apart and have the same frequency as the LO system 210 output signal. The LOI and LOQ signals are respectively mixed with the LNA output signal by the in-phase signal mixer 262 and the quadrature signal mixer 263.

The outputs of the in-phase signal mixer 262 and the quadrature signal mixer 263 are respectively coupled to the inputs of the IF amplifier in-phase (IFA I) 264 and the IF amplifier quadrature (IFA Q) 265. The in-phase signal mixer 262 and the quadrature signal mixer 263 are operable to down-convert the amplified radio wave signal in response to the LO output signal of generated by the LO system 210 and to generate a baseband signal in response to the amplified radio wave signal. The outputs of the IF amplifier in-phase 264 and the IF amplifier quadrature 265 are respectively coupled to the inputs of the ADC in-phase (ADC I) 270 and the ADC quadrature (ADC Q) 272. The digital outputs of the ADC in-phase 270 and the ADC quadrature 272 are collectively received by one or more subsequent digital signal processing modules as a complex ADC output (or simply, "ADC output"). The complex ADC output is represented as: ADC I output+j*ADC Q output, where j is the square root of minus one. The ADC I output represents the real part and ADC Q output represents the imaginary part of the complex ADC output. The complex ADC output is processed "downstream" and analyzed by the radar FFT processor 290 to detect, for example, the presence and the relative position and velocity of reflective objects with respect to the noise-mitigated FMCW radar system 200. Such processing optionally includes performing a transform of the spectrum difference to generate a time-domain signal having enhanced information of objects of interest in the reflected radar signal.

As described herein, various embodiments are disclosed that are optionally implemented in hardware (e.g., analog), software (e.g., digitally), and/or combinations thereof. Accordingly, the output of the mixer 260 and the ADCs 270 and 272 output are typically functionally similar, with the difference that the output of the mixer 260 is an analog version of the output of the ADCs 270 and 272 and that the output of the ADCs 270 and 272 has been digitally filtered.

Both such signals are referred to herein as the baseband signal, while the frequency and phase of the interferer signal at the mixer 260 or ADCs 270 and 272 output are referred to as the interferer offset frequency and phase in the baseband signal.

The ADC (complex) output is coupled to the multiplexer 286 via the digital signal shifter 284 (if present and enabled). The digital signal shifter 284 is programmed with a signal shift value that is one of a frequency shift ω1 (e.g., ($\omega_{ANT}$)), a phase shift φ1 (e.g., $\varphi_{ANT}$), or both. The digital signal shifter 284 is operable to perform frequency and phase shifting in accordance with:

$$y(n)=x(n)*e^{(j\omega 1*n*Ts+\varphi 1)} \quad (1)$$

where y(n) is the signal shifter 284 output, x(n) is the ADC output (e.g., as coupled to the input of the digital signal shifter 284), Ts is the sampling clock period (e.g., the inverse of the sampling rate of ADC I 270 and ADC Q 272), and n represents the sample index (e.g., where n is 0, 1, 2, 3, ... ). Accordingly, the output of the digital signal shifter 284 is also a complex signal with real and imaginary portions (e.g., respectively having a signal shifted ADC I 270 output and a signal shifted ADC Q 272 output, wherein the complex output signal is shifted in frequency and/or phase). The frequency shift ω1 and phase shift φ1 represent frequency and phase in radians/Hz and radians and are expressed as digital words (e.g., binary numbers) having a known relation between the magnitude of the units of the digital words and the frequency (Hz) and phase (radian) of the shift amount.

The multiplexer 286 is operable to select either (or both when in bypass mode, for example) of the real and imaginary portions of a received complex signal and to forward the selected portion of the received complex signal for downstream processing. When the digital signal shifter 284 is present and enabled, the received complex signal of the multiplexer 286 is the output of the digital shifter 284. When the digital signal shifter 284 is not enabled, the received complex signal is the ADC (complex) output.

The selection of the real or imaginary portions of the received complex signal is made in response to a comparison the amplitude noise in the system with the phase noise. The comparison is performed, for example, after the design of a particular system and before deployment (e.g., where the particular system is tested before shipping to determine which signal portion predominately includes more noise). The comparison is also optionally performed dynamically (e.g., after deployment) by using the radar FFT processor 290 for determining the signal-to-noise ratios of the respective real and imaginary portions of the received complex signal.

The select input of the multiplexer 286 is driven (e.g., by the multiplexer controller 292) based of the comparison the amplitude noise in the system with the phase noise. For example, when the amplitude noise in the system dominates over the phase noise, the select input is driven such that the imaginary portion of the received complex signal is forwarded by the multiplexer 286; otherwise, the select input is driven such that the real portion of the received complex signal is forwarded by the multiplexer 286. When the multiplexer controller 292 asserts the bypass signal, the multiplexer 286 is operable to pass both the real and imaginary portions of the complex signal.

The multiplexer controller 292 is operable to assert the bypass signal, for example, when the amplitude noise and the noise in the system differ in power by less than a predetermined threshold (e.g., around 3 dB). When the predetermined threshold is around 3 dB and the multiplexer 286 is not being bypassed (e.g., when a selected one of the real or imaginary portions is being forwarded), the dominant noise is relatively highly suppressed (e.g., by not being forwarded), while the forwarded noise in the selected portion is effectively increased by 3 dB at the output. When the multiplexer controller 292 asserts the bypass signal, the signal shifters 212 (if present), 284 (if present), and 288 are disabled, such that their respective input signals are directly forwarded as their output signal irrespective of any programmed frequency shift and phase shift controls.

The output of the multiplexer controller 292 is forwarded to the signal shifter 288, which operates similarly to the signal shifter 284, except that any initial signal shifting performed by the signal shifters 212 and/or 284 is substantially negated by performing (for example) a correctional signal shift that is substantially equal and opposite to the initial signal shifting. The output of the signal shifter 288 is coupled to the radar FFT processor 290 during operation to identify the presence and position of reflective objects around the radar apparatus. For example, the correctional signal shifting allows the radar FFT processor 290 to correctly identify the presence and position of reflective objects that would otherwise be skewed when processing a signal-shifted signal without the correctional signal shifting. (Likewise, the estimation of relative distance to the object will have an offset and estimation of angle of the object would be erroneous if no correctional signal shifting were performed.)

The ADC output is coupled to an estimator 282 that is operable to estimate the frequency and phase of a dominant reflection in the ADC output signal. The dominant reflection is the largest signal return (e.g., reflection) resulting from antenna coupling or a near-object reflection (such as a vehicle bumper or other vehicle component). The estimator 282 determines the dominant reflection by performing an FFT of the ADC output and determining which FFT output bin (e.g., peak bin) corresponds to the frequency of the dominant reflection.

For example, the corresponding FFT output bin is typically the output bin that has the highest magnitude in a certain range of frequencies. Interpolation of the magnitude of neighboring FFT output bins is optionally performed in order to more accurately determine the location of the peak to improve the accuracy of frequency and phase estimation. The frequency of the peak FFT bin is determined in accordance with the quantity of 2*pi*the FFT index of the peak bin*the ADC sampling rate, the quantity divided by the number of points of the FFT. The peak-bin FFT index is an integer or a real number (when the peak-bin FFT index is interpolated) and represents the index of the FFT output bin corresponding to the dominant reflection. The phase is estimated using the angle of the complex number associated with the peak-bin FFT index (e.g., when the peak-bin's FFT value is the complex number a+jb, the phase is the angle of a+jb, where a is the real portion of the complex number and b is the imaginary portion of the complex number).

The range of frequencies in which the dominant reflection is expected to occur is determined in response to: a) the FMCW slope (e.g., discussed below with respect to FIG. 3a and FIG. 3b); b) the expected range of distances of the near-object reflections (e.g., from a bumper) or the antenna spacing (e.g., from antenna coupling); and c) the speed of electromagnetic wave propagation in air (e.g., around 3*10^8 m/s) and in the radar system 200 apparatus itself (e.g., around 2*10^8 when integrated circuit and printed circuit board-based components are used). The expected range of distances (e.g., for the dominant reflection) are optionally pre-programmed by vehicle (and/or radar system)

designers into the estimator 282 and/or dynamically determined by the radar system 200.

The dominant reflection expected frequency is determined as the multiplicative product (e.g., result of multiplication) of the round trip propagation delay and the FMCW slope. The round trip propagation delay is a summation of propagation delays inside the radar system 200. Such propagation delays include delays encountered: a) in the PA 220; b) in the transmission line from the PA 220 to the TX antenna 230; c) in the transmission line from the RX antenna 240 to the LNA 250; d) in the LNA 250, e) in the transmission line from the LNA 250 to the mixer 260; f) in the transmission line from the mixer 260 to the ADC 270 and 272; and g), and an extra propagation delay. The extra propagation delay is the TX-antenna-to-RX-antenna coupling delay (in the case where antenna coupling is dominant) or the propagation delay from the TX antenna 230 to the near-object reflector 208 (e.g., bumper) and from the near-object reflector 208 to the RX antenna 240 (e.g., in the case where bumper reflection is dominant). When the round trip propagation delay has a known range, the range of expected frequency of the dominant reflector is determined in accordance with the above description. In the example radar system 200, the expected range of the dominant reflector expected frequency is programmed to the estimator 282 as described above.

The estimation of the frequency and phase of the dominant reflection as determined by the estimator 282 is expressed as $\omega$ and $\varphi$, respectively. The negative values of $\omega$ and $\varphi$ ($-\omega$ and $-\varphi$) are used (singly or in combination) to program (either or both) of the signal shifters 212 (if present) and 284 (if present). The positive values of $\omega$ and $\varphi$ (e.g., the estimated phase and frequency shift) are programmed into the signal shifter 288 (e.g., to compensate for the initial signal shifting performed by signal shifter 212 and/or signal shifter 284). The estimation of the frequency and phase of the dominant reflection as determined by the estimator 282 is optionally performed in an initial calibration routine (e.g., before normal operation) where a relative few "chirps" are transmitted and then processed by the estimator 282 (which is optionally embodied within the radar FFT processor 290).

In a "transmit-side" signal-shifting embodiment, the LO system 210 output signal is coupled to the PA 220 via the optional analog (RF) signal shifter 212 (e.g., such that the signal shifter 212 is operable to perform RF signal shifting). The analog signal shifter 212 is operable to perform a programmed frequency shift ($\omega 1$) and phase shift ($\varphi 1$) upon the LO system 210 output signal in accordance with:

$$y(t)=x(t)*e^{(j*2\pi*\omega 1*t+\varphi 1)} \quad (2)$$

where y(t) is the output of the analog signal shifter 212, x(t) is the LO system 210 output signal that is input to the analog signal shifter 212, and t is time.

In an embodiment, the analog signal shifter 212 is responsive to analog signal shift controls. The signal shift is controlled by: a) generating (e.g., in the LO 210) LO I and LO Q signals (which are 90 degrees apart) using an IQ mixer; b) respectively multiplying the LO I signal with a value cos(theta2) and the LO Q signal with a value sin(theta2); and c) adding the two respective products to generate the signal shifter's output. The value of theta2, is a phase (radian) quantity represented using a digital word (binary number) with a known relation between the digital word's unit and the phase (radian) and is digitally generated to be equal to the quantity ($2\pi*\omega 1*t+\varphi 1$). In another embodiment, a transmission line with a programmable delay is operable to vary the delay using a digital control signal proportional to the phase quantity($2\pi*\omega 1*t+\varphi 1$).

In the transmit-side signal-shifting embodiment, the negative values of $\omega$ and $\varphi$ ($-\omega$ and $-\varphi$) are programmed into the analog signal shifter 212 while the positive values of $\omega$ and $\varphi$ are programmed into the signal shifter 288. When the entire negative values of $\omega$ and $\varphi$ are programmed into the analog signal shifter 212, the signal shifter 284 (e.g., after the ADC I 270 and the ADC Q 272) is bypassed such that the signal shifter 284 performs no signal shifting.

In a "receive-side" signal-shifting embodiment, the LO system 210 output signal bypasses the optional analog (RF) signal shifter 212, and is coupled to the PA 220. The digital signal shifter 284 is programmed with the negative values of $\omega$ and $\varphi$ ($-\omega$ and $-\varphi$) while the positive values of $\omega$ and $\varphi$ are programmed into the signal shifter 288. When the entire negative values of $\omega$ and $\varphi$ are programmed into the digital signal shifter 284, the analog (RF) signal shifter 212 is bypassed such that the signal shifter 212 performs no signal shifting.

In a "transmit- and receive-side" embodiment, a portion of the initial phase and frequency shift (e.g., $-\omega$ and $-\varphi$) is shifted by the transmit-side signal shifter 212 and the remaining portion shifted by the receive-side signal shifter 284. The positive values of $\omega$ and $\varphi$ are programmed into the signal shifter 288.

In each of the above embodiments, the signal shifter 284 is optionally bypassed (such that the signal shifter 284 output is substantially similar to the signal shifter 284 input). When the signal shifter 284 is optionally bypassed and the positive values of $\omega$ and $\varphi$ are provided to the radar FFT processor 290 as input information such that the FFT processor is operable to compensate for the initial signal shifting.

For example, the radar FFT processor 290 is operable to interpret the FFT outputs appropriately based on input information. For example, the radar FFT processor 290 is operable to interpret the output of an FFT (e.g., one-dimensional) of the selected data sent to the FFT processor by shifting the indices of the FFT output array by an amount proportional to the multiplicative product of the FFT input sampling rate and w. The radar FFT processor 290 is also operable to interpret the output of an FFT by multiplying the FFT output by e raised to the power of the quantity j times $\varphi$.

One transmit-side signal-shifting embodiment includes a mixer 260 that is a "real" mixer (e.g., as compared with a quadrature IQ mixer). Accordingly, the mixer Q 263 is absent in the transmit-side signal-shifting embodiment and the input of IQ splitter 261 is forwarded directly to the output of mixer I 262. Accordingly, the IF amplifier and filter (IFA Q) 265 and the ADC Q 272 are also absent. The output of ADC I 270 is directly processed by the FFT processor. In such a sub-embodiment, the signal shifter 284, multiplexer 286 and signal shifter 288 are absent or operate in bypass mode, forwarding the output of ADC I 270 directly to the FFT processor 290. Transmit-side signal-shifting embodiments typically entail lower manufacturing costs due to fewer components in the receiver. Either of the signal shifter 212 and signal shifter 299 in the transmitter is typically active at the same time and is operable to mitigate one of the amplitude and phase noise associated with the interferer signal.

Figure 3A:
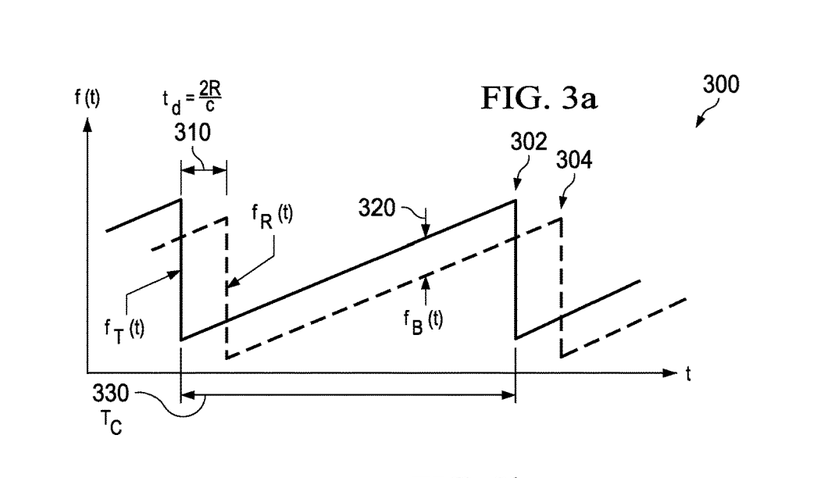
FIG. 3a is a frequency waveform diagram of reflected FMCW radar system signals in accordance with embodiments of the disclosure.

FIG. 3a is a frequency waveform diagram of noise-mitigated FMCW radar system signals in accordance with embodiments of the disclosure. Generally described, waveform diagram 300 includes waveforms illustrating frequency information of transmitted signal 302 and frequency information of reflected signal 304. The transmitted signal 302 is a signal transmitted by a radar transmitter (such as the transmitter 202 of the noise-mitigated FMCW radar system 200). The received signal 304 is a signal received by a radar receiver (such as the receiver 204 of the noise-mitigated FMCW radar system 200).

The frequency of transmitted signal 302 is represented by the function $f_T(t)$. The transmitted signal 302 is frequency-modulated in accordance with a sawtooth waveform in which the frequency of the transmitted signal 302 gradually rises from a low frequency to a high frequency (e.g., having a positive FM slope). The time period (e.g., the pulse-width in time of the sawtooth waveform) over which the transmitted signal 302 rises from the low frequency to the high frequency is represented by $T_c$ 330. Accordingly, each reflected signal 304 corresponds to a baseband signal (e.g., the output of the mixer 260), whose frequency is proportional to the reflecting object's distance and the selected FM slope.

The reflected signal 304 is a reflection of the transmitted signal 302, where the reflection is ideally caused by an object of interest (e.g., target, object, hazard, navigation structure, and the like) that reflects radio signals. A radar receiver (e.g., receiver 220) receives the reflected signal 304 and processes the reflected signal 304 to extract information related to the object of interest.

The reflected signal 304 has a delay 310 with respect to the transmitted signal 302. The delay 310 is:

$$t_d = \frac{2R}{c} \quad (3)$$

where $t_d$ is the delay 310, R is the range to the object of interest, and c is the average of the speeds of the transmitted signal 302 and the reflected signal 304. The frequency difference 320 represents the frequency difference between transmit and receive signals corresponding to a certain reflector, and is the summation of the delay 310 (e.g., the $t_d$ of Equation (3)) with a Doppler frequency associated with the reflector-radar relative velocity. The received signal also has a reduced amplitude than transmit signal due to path loss (not explicitly shown). Accordingly, FIG. 3a illustrates, for example, the frequency of transmitted and received signals associated with one reflector for one FMCW chirp, whose duration is $T_C$ 330.

Figure 3B:
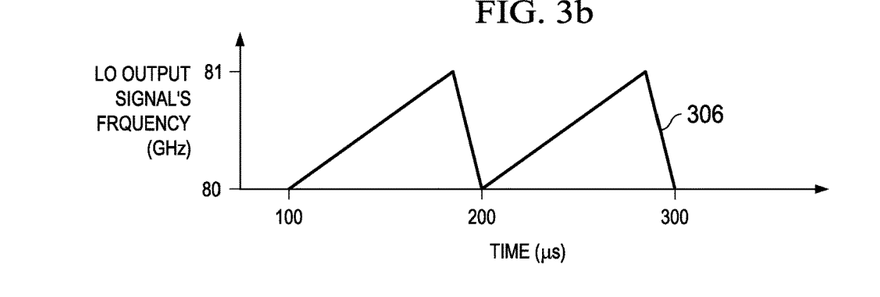
FIG. 3b is a frequency waveform diagram of the periodicity and frequency range of FMCW radar system signals in accordance with embodiments of the disclosure.

FIG. 3b is a frequency waveform diagram of the periodicity and frequency range of FMCW radar system signals in accordance with embodiments of the disclosure. Generally described, waveform diagram 300 includes a transmitted signal 306. The transmitted signal 306 is a signal transmitted by a radar transmitter (such as the transmitter 202 of the noise-mitigated FMCW radar system 200). In the example waveform shown in FIG. 3b, the transmitted signal has an instantaneous frequency that cycles (e.g., modulates) from 80 GHz to 81 GHz over a period of around 100 microseconds (µs). The instantaneous frequency increases at a slope of around 10 MHz/µs and decreases at a much steeper slope (the FMCW system uses the time during the decrease to prepare for a next chirp. e.g., starting at 200 us and 300 us). In various embodiments, the instantaneous frequency are optionally cycled between 76 GHz to 77 GHz, 77 GHz to 81 GHz, or 24 to 24.5 GHz, (including any of the respective sub-bands of these ranges) at an increase slope selected from a value of 0.1 through 100 MHz/µs.

Figure 4:
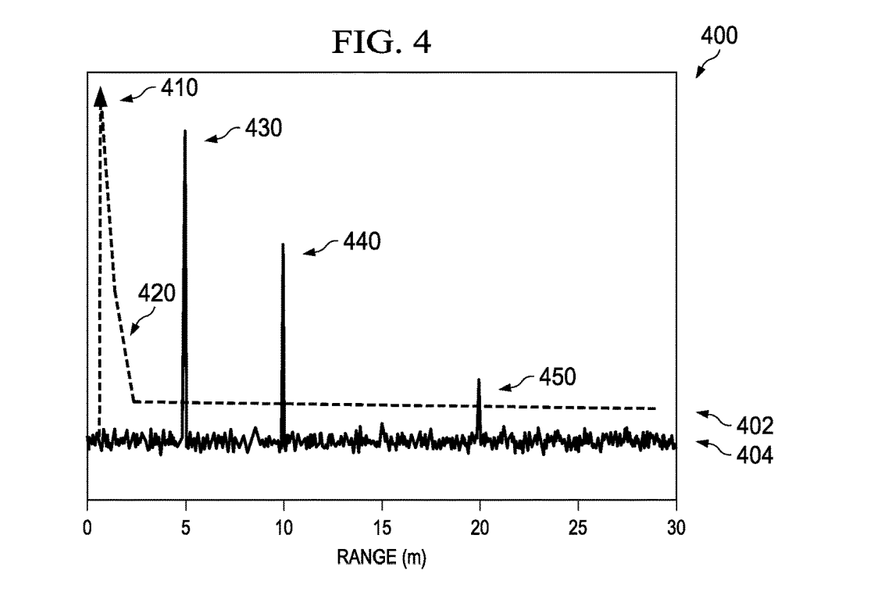
FIG. 4 is an amplitude waveform diagram of noise-mitigated FMCW radar system signals in accordance with embodiments of the disclosure.

FIG. 4 is an amplitude waveform diagram of noise-mitigated FMCW radar system signals in accordance with embodiments of the disclosure. Generally described, waveform diagram 400 shows the FFT spectrum of the received signal at the ADC output which includes the reflected transmitted signal 404 and coupled noise signal 402. The FFT spectrum's x-axis is the ADC output's frequency and y-axis the FFT value at that frequency. In FMCW radar, the x-axis (ADC output frequency) is proportional to the relative distance between the radar and reflecting object too. Accordingly, the x-axis may be interpreted in terms of ADC output frequency or in terms of relative object distance.

For example, the reflected transmitted signal 404 indicates range information for detected objects of interest: object 430 at 5 meters; object 440 at 10 meters; and object 450 at 20 meters. Generally, the higher the range that the detected object has, the lower the signal amplitude that results in the FFT spectrum (while the noise floor of the reflected transmitted signal 404 makes the detection of the low signal amplitude faraway objects difficult). In the disclosed noise mitigated FMCW radar system, the noise floor is lower, for example, because the dominant noise associated with the dominant reflector is mitigated by the disclosed method and apparatus. Accordingly, the increased sensitivity of the noise-mitigated FMCW radar 138 allows detection of objects of interest at increased ranges for a given transmission signal.

The coupled noise signal 402 includes an low frequency tone 410, which results from direct coupling from the transmitting antenna (e.g., 230) to the receiving antenna (e.g., 240). The direct coupling results, for example, from antenna coupling. The relatively high amount of such antenna coupling create a baseband signal having a substantially strong first low frequency (e.g. few KHz, in a typical 77 GHz radar system) portion. Similarly, strong undesired reflection from near objects (e.g., a car bumper, which is often mounted just in front of the automotive radar system) creates a baseband signal having a substantially strong low second frequency (e.g. few tens of KHz) portion. Noise associated with the low frequency tone 410 and other frequencies is indicated by the skirt 420. The skirt 420 has a "skirt" shape in the frequency domain where the noise is greater at lower frequencies and the noise at higher frequencies (although the noise at higher frequencies is relatively lower than the noise at lower frequencies, the noise of the higher frequencies can be relatively higher than the receiver's thermal noise).

The skirt ($\alpha(t)$) 420 is understood to be substantially affected by up-conversion of pink noise (e.g., flicker noise) in the PA (e.g., 220) and the LNA (e.g., 250). The amplitude noise $\alpha(t)$, for example, refers to perturbations in the envelope of the RF (radio frequency) signal that is transmitted and received.

The uncorrelated phase noise ($\phi_u(t)$) skirt is phase noise that is not common between a first signal path (extending from the LO system 210 to the mixer 260) and a second signal path (extending from the LO system 210 to the transmission antenna 230 and through the LNA 250 in the reflected signal's path till the mixer 260). The uncorrelated phase noise includes noise caused from perturbations, introduced by the non-ideal buffers between transmitter and receiver, with respect to the zero crossing time instances of the LO signal when generating their respective outputs. In contrast, an ideal buffer creates an output signal that is an exact replica of the input signal, with the possible exception of a delay that is constant.

The uncorrelated phase noise skirt additionally includes the portion of the phase noise generated in the LO system 216 that is not fully suppressed naturally by the radar mixer 260. As do other similar types of mixers, the mixer 260 naturally provides a high pass filter type of suppression to the phase noise generated in the LO system 612, where the high-pass filter corner frequency is inversely proportional to the time delay from the generation of the radar signal by the transmitter to its reception at the mixer after reflection by external objects or through electromagnetic coupling from the transmit antenna to the receive antenna. The term "phase noise" or "phase noise skirt" is understood to generally refer to the uncorrelated portion of the phase noise of the noise-mitigated FMCW radar.

The uncorrelated phase noise $\phi_u(t)$ and the skirt $(\alpha(t))$ substantially affect the receiver noise level in the signal received through the LNA 250 at the mixer 260 in accordance with:

$$S_R = A(1 + \underbrace{\alpha(t)}_{AN})\cos(2\pi f_c t + \underbrace{\phi_c(t) + \phi_u(t)}_{PN(corr\&uncorr)}) \quad (4)$$

where $S_R$ is the signal received at the LNA 250 corresponding to a reflector or interferer, A is a constant representing the reflected signal's amplitude in the ideal case (without amplitude noise), $\alpha(t)$ is the multiplicative amplitude noise (AN) introduced in the PA 220 and the LNA 260 (calling it multiplicative since it multiplies with the ideal signal), $f_c$ is the carrier frequency (the LO system output frequency when it is received through the PA 220, through reflections from external objects or antenna coupling and through LNA 250), PN is phase noise (both correlated and uncorrelated), $\phi_c(t)$ is correlated phase noise, and $\phi_u(t)$ is the uncorrelated phase noise. The correlated phase noise $\phi_c(t)$ is substantially reduced at the mixer 260 output, which leaves the uncorrelated phase noise $\phi_u(t)$ as a primary source of phase noise at the output of the mixer 260.

Due to the delayed nature of the received reflection with respect to the transmitted wave, the baseband signal (e.g., the signal generated at the output of the mixer 260) is "one-sided" (e.g., positive) with respect to frequency. As discussed below, the radar FFT processor 290 of the noise-mitigated FMCW radar 138 is operable to distinguish between positive and negative frequencies of the baseband signal and to perform frequency shifting (e.g., frequency shifting and phase rotation, collectively "rotation" or "de-rotation").

Figure 5:
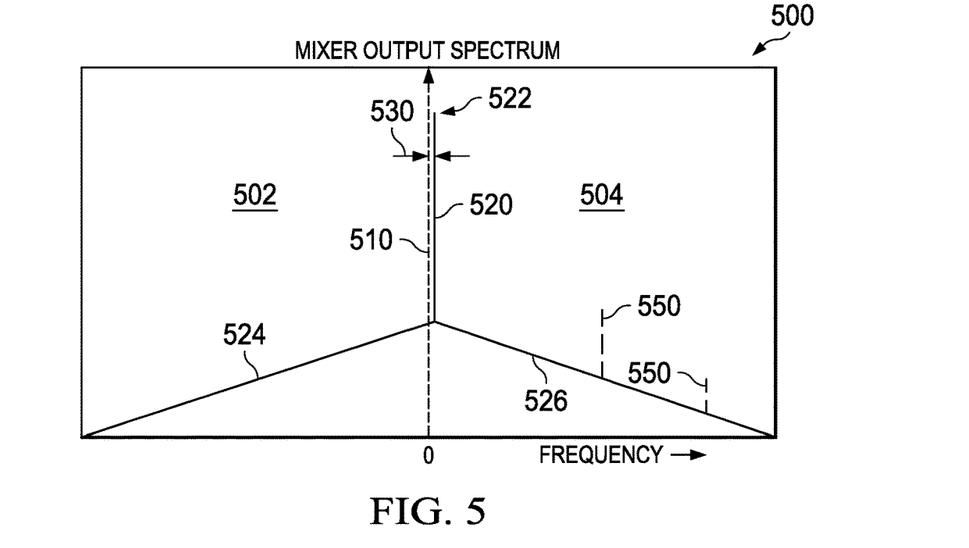
FIG. 5 is a mixer-output spectrum diagram of a noise-mitigated FMCW radar system signal in accordance with embodiments of the disclosure.

FIG. 5 is a mixer-output spectrum diagram of a noise-mitigated FMCW radar system signal in accordance with embodiments of the disclosure. Generally described, spectrum diagram 500 includes a negative frequency range 502 and a positive frequency range 504. Envelope 520 represents the relative highest excursions of the power of the input baseband signal ranging throughout the negative frequency range 502 and the positive frequency range 504. The envelope 520 includes the dominant interferer 520, the amplitude leakage negative frequency portion 524, and the amplitude leakage positive frequency portion 525.

The amplitude leakage negative frequency portion 524 mostly contains amplitude noise and uncorrelated phase noise and is free of desired object tones (e.g., frequencies in the de-rotated signal that represent one or more desired objects). The disclosed method and apparatus, for example, is operable to exploit the property that the noise associated with the dominant interferer 522, on the frequency side to the left and right of the dominant interferer 522 is symmetric or complex conjugate symmetric (e.g., the noise on the left side of the spectrum is the same as the noise on right side of the spectrum for the case of amplitude noise as they are complex conjugates of each other for the case of phase noise).

The dominant interferer (e.g., the highest portions of the reflected signal spectrum envelope) 522 contains, for example, frequency components from the low frequency tone 410 and the tail-off components of skirt 420. The dominant interferer 520 is offset (e.g., having a frequency separation) from the y-axis at the DC (e.g., "zero") frequency point by a frequency offset 530. The frequency offset 530 is also referred to as the interferer offset frequency, which has a phase offset (e.g., the phase of the interference signal with respect to a sinusoid of the interferer offset frequency). As discussed above, the frequency and phase offsets depend on the FMCW slope and the interferer round trip delay.

In accordance with equation (4) discussed above, the beat signal (e.g., baseband output signal) at the mixer (e.g., 260) output, corresponding to the dominant interferer, is of the form:

$$r(t) = A(1 + \underbrace{\alpha(t)}_{AN})\underbrace{e^{j(\theta_{int}+\omega_{int}t)}}_{Interferer}\underbrace{e^{j\phi(t)}}_{PN} \quad (5)$$

where r(t) is the beat signal at the mixer output corresponding to the dominant interferer, $\theta_{int}$ is the phase of the dominant interferer (interferer offset phase), $\omega_{int}$ is the frequency of the dominant interferer (interferer offset frequency), (t) is time, AN is amplitude noise introduced in PA 220 and LNA 250 associated with the dominant interferer, and PN is the phase noise introduced in PA 220 and LNA 250 associated with the dominant interferer. The quantities $\theta_{int}$ and $\omega_{int}$ vary instantaneously in response to the FMCW slope, the start frequency, and the round trip distance to the interferer.

The actual value of the phase shift $\theta_{int}$ is determined by the estimator 282 and subsequently used to force (e.g., by operation of the initial signal shifters 212 and/or 284) substantially all noise to be directed fully into the real arm (e.g., I-chain signal) or the imaginary arm (e.g., Q-chain signal) at the output of the signal shifter 284. Accordingly, one of the imaginary arm and the real arm is selected to enable processing of a signal that is substantially devoid of the dominant noise. The dominant noise is, for example, the greater of the uncorrelated phase noise or amplitude noise associated with the dominant interferer (e.g., the largest of multiple interferers, which can be the vehicle body reflection and/or the TX antenna to RX antenna coupling).

When the beat signal is derotated by the frequency and phase of the dominant interferer 520, the resulting signal (e.g., de-rotated baseband signal) has amplitude noise associated with to the dominant interferer in a real part and phase noise associated with the dominant interferer predominantly in an imaginary part:

$$r_{derot}(t) = \underbrace{A(1 + \underbrace{\alpha(t)}_{AN})\underbrace{e^{j\phi(t)}}_{PN}} \cong A(1 + \alpha(t))(1 + j\phi(t)) \cong A(1 + \alpha(t) + j\phi(t)) \quad (6)$$

where $r_{derot}(t)$ is the beat signal at the mixer output (other variables are consistent with variables discussed above for Equation (5)).

The radar FFT processor 290 is operable to signal shift (e.g., "de-rotate") the received signal by the amount of the offset 530 (e.g., the frequency and phase of the dominant interferer 520), and operable to create a de-rotated signal. The created de-rotated signal is centered having a dominant reflector portion of the spectrum baseband version around DC, such that the amplitude noise of the de-rotated signal is contained in the amplitude leakage positive frequency portion 526 (e.g., real part) and the amplitude leakage negative frequency portion 524 (imaginary part). Accordingly, signal shifting is optionally performed by: a) signal shifters 212 and/or 284 (with signal shifter 288 bypassed; or b) the FFT processor 290 (with signal shifters 212, 284, and 288 bypassed).

Each portion of the amplitude and phase noise of the de-rotated baseband signal that corresponds to the dominant interferer 520 has a symmetric (or "conjugate symmetric") spectrum. In contrast, the signals of actual object reflections correspond only to one-sided frequencies (e.g., in accordance with whether the FM slope is positive or negative). The radar FFT processor 290 is operable to respectively analyze the amplitude noise and the phase noise of the de-rotated baseband signal.

The analysis includes, for example, determining whether the amplitude noise or the phase noise dominates in the de-rotated baseband signal. When the radar FFT processor 290 (for example) determines that the amplitude noise dominates, the imaginary part of the de-rotated baseband signal alone is processed further (e.g., by the radar FFT processor 290) to detect and locate one or more objects of interest 550. When the radar FFT processor 290 (for example) determines that the phase noise dominates, the real part alone is alone is processed further (e.g., by the radar FFT processor 290) to detect and locate one or more objects of interest 550. (As discussed above with respect to FIG. 2, the analysis is optionally performed for a particular design and the results of the analysis programmed into device components before deployment of the system.)

Accordingly, either amplitude noise or uncorrelated phase noise (e.g., whichever is determined to be higher) can be mitigated (e.g., lowered) at the "cost" (e.g., performance penalty) of 3 dB SNR (signal-to-noise ratio) loss. The 3 dB loss results from the subtraction of only real or imaginary components of the de-rotated baseband signal. As discussed above with respect to equation (2), the phase noise is uncorrelated between the two inputs of the (e.g., receive) mixer. Embodiments which perform de-rotation on the received baseband signal are referred to as, for example, "receive-side" embodiments.

In other embodiments, a "transmit-side" noise-mitigated FMCW radar includes a transmitter operable to frequency and phase shift the transmitted signal. The frequency- and phase-shifted signal (e.g., which includes correlated phase noise) is coupled to the input of the receiver mixer. In the transmit-side noise-mitigated FMCW radar, the phase of the transmit wave is modulated continuously using a FM slope having a starting frequency and starting phase such that the dominant interferer 520 is at the DC point of the receiver mixer output signal spectrum.

Accordingly, the transmit-side noise-mitigated FMCW radar generates the de-rotated signal at the receiver mixer output. The transmit-side noise-mitigated FMCW radar processing is similar to the receive-side noise-mitigated FMCW processing of the de-rotated signal. The disclosed de-rotation and processing of the de-rotated signal are at least applicable in various embodiments having, for example, one dominant interferer 520, and where either the amplitude or the uncorrelated phase noise is dominant and substantially above the receiver noise floor.

Figure 6:
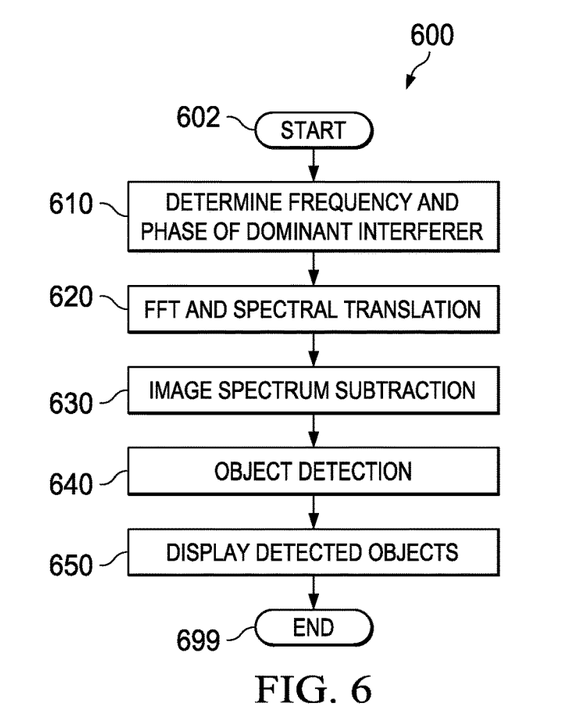
FIG. 6 is a process flow diagram using software-assisted signal shifting in accordance with embodiments of the invention.

FIG. 6 is a process flow diagram using software-assisted signal shifting in accordance with embodiments of the invention. In embodiments operable to perform software-assisted signal shifting, the radar apparatus need not have all components described with reference to FIG. 2 are present. For example, in an embodiment where software is operable to perform signal shifting in a digital domain, the signal shifter 212 is absent and ADC (e.g., 270 and 272) outputs go directly to the FFT processor 290. In such a system, the FFT processor's software or firmware is coded in a way to achieve noise mitigation in accordance with process flow 600. (In comparison, an embodiment where hardware is operable to perform signal shifting is described below with respect to FIG. 8.)

Process flow 600 begins in terminal 602 where process flow proceeds to operation 610. In operation 610, the frequency and phase of a dominant interferer is determined. Initially, an FMCW chirp is transmitted and the return signal containing the dominant interferer is received and processed similar to the processing described above for the estimator 282. The frequency and phase of a dominant interferer is determined by performing an FFT of the ADC output to determine which FFT output bin (e.g., peak bin) corresponds to the frequency of the dominant reflection. The value of the FFT output bin corresponding to the dominant interferer is denoted as M (where M is optionally a fractional number when the dominant interferer frequency is determined substantially accurately using interpolation of neighboring FFT values) and the value of the phase of the dominant interferer is denoted as P. In embodiments where the processing for finding the frequency and phase of the dominant interferer is primarily coded in software and/or firmware, the processing is similar to the processing performed by the estimator 282. As described below with reference to FIG. 8, finding the frequency and phase of the dominant interferer in hardware-assisted signal shifting embodiments, the operations are performed, for example, by hardware circuits and blocks in the hardware embodiment (various combinations of hardware-assisted and software assisted signal shifting are possible). Program flow proceeds to operation 620.

In operation 620, an FMCW chirp is transmitted and the return signal containing the dominant interferer and signals corresponding to reflections from objects surrounding the radar apparatus is received and processed. For example, an FFT (fast Fourier transform) of the ADC output is determined in response to the return signal, where the FFT output sequence is represented by X[k], where k represents FFT output bin index or frequency sample index of an FFT and X[k] represents the value of the complex FFT sequence corresponding to the $k^{th}$ FFT output bin index. The FFT output sequence is spectrally translated to determine a new sequence Y[k], where Y[k]=X[k−M]*exp(−j*P), and where M is the FFT output bin index (or frequency sample index) corresponding to the dominant interferer, also called the interferer bin, as determined in the operation 610. Program flow proceeds to operation 630.

In operation 630, an image spectrum subtraction operation is performed. The amplitude and uncorrelated noise associated with the dominant interferer are real quantities, and accordingly have a conjugate symmetric spectrum. In the image spectrum subtraction, noise from the positive portion of the frequency spectrum is suppressed in response to the noise estimate of the negative portion of the frequency spectrum, such that the desired object tones are primarily present (and/or substantially enhanced) in the spectrum after the subtraction. Accordingly, when amplitude noise dominates in the system, a new sequence Z[k] is determined, where Z[k]=(Y[k]−Y'[−k])/2, and where Y' represents the complex conjugate of the Y sequence, and the sequence Z is said to be the "conjugate odd component" of Y around 0 (zero) frequency or 0 bin. In cases where the uncorrelated phase noise dominates in the system, the new sequence Z[k] is determined as Z[k]=(Y[k]+Y'[−k])/2, and the sequence Z is said to be the "conjugate even component" of Y around 0 frequency or 0 bin. Program flow proceeds to operation 640.

The spectral translation performed as part of operation 620 and the image spectrum subtraction performed in operation 630 are one embodiment of noise suppression. Generally, even without doing such spectral translation, the results of a spectral translation can be achieved, for example, by performing an optional negation routine.

When amplitude noise dominates in the system, the new sequence Z[k] is determined by the optional negation routine as: Z[k]=exp(−j*P)*(Y[k]−Y'[M−(k−M)])/2. Such processing is referred to as "extracting the conjugate odd component around the interferer bin, M." In cases where the uncorrelated phase noise dominates in the system, the new sequence Z[k] is determined by the optional negation routine as Z[k]=exp(−j*P)*(Y[k]+Y'[M−(k−M)])/2. This processing is referred to as "extracting the conjugate even component around the interferer bin, M." The extracted values (the sequence Z[k]) have a suppressed amount of amplitude or uncorrelated phase noise, which allows, for example, enhanced identification of reflecting objects as compared against conventional radar processing.

In operation 640, the sequence Z[k] obtained in operation 630 is used for further conventional FMCW radar signal processing to determine the presence and relative position of surrounding objects. In an embodiment, the operation 620 and 630 are repeated multiple (say L) times, and multiple (L) sequences (Z[k]'s) obtained from all these times are collectively processed using conventional radar signal processing techniques, such as performing FFT of the sequence of L Z[0]'s, FFT of the sequence of L Z[1]'s, FFT of the sequence of L Z[2]'s, . . . and processing those FFT's outputs to determine the presence, relative position and velocity of surrounding objects. The determined information can be used to perform safety functions (e.g., braking when a hazard exceeds a closing threshold), controlling robotic machines (e.g., piloting a drone or controlling a robot arm), and performing other such temporal-spatial control tasks. The radar FFT processor is optionally operable to generate such control commands in response to the determined information of the reflecting objects.

In different embodiments, indices, k (also called FFT indices), having magnitude of Z[k] significantly higher than the set of magnitudes of Z[p] where p are indices in the vicinity of k, are identified. The distance to perceived objects is determined by multiplying the frequencies corresponding to the identified indices by the speed of light ($3\times10^8$ m/s) and dividing the product by twice the rate of change of frequency of the transmit signal (the FMCW signal's frequency slope). The distance information of the perceived objects is optionally used by the processor controlling the robotic vehicle, for example, to accelerate, decelerate, or deviate from an original course determined for the robotic vehicle. Program flow optionally proceeds to operation 650 or terminal 699.

In operation 650, the distance information of the objects of interest is optionally displayed having range information such that, for example, a user can quickly determine the presence of an object and the range of the object. Program flow proceeds to terminal 699 where the program flow terminates.

Figure 7:
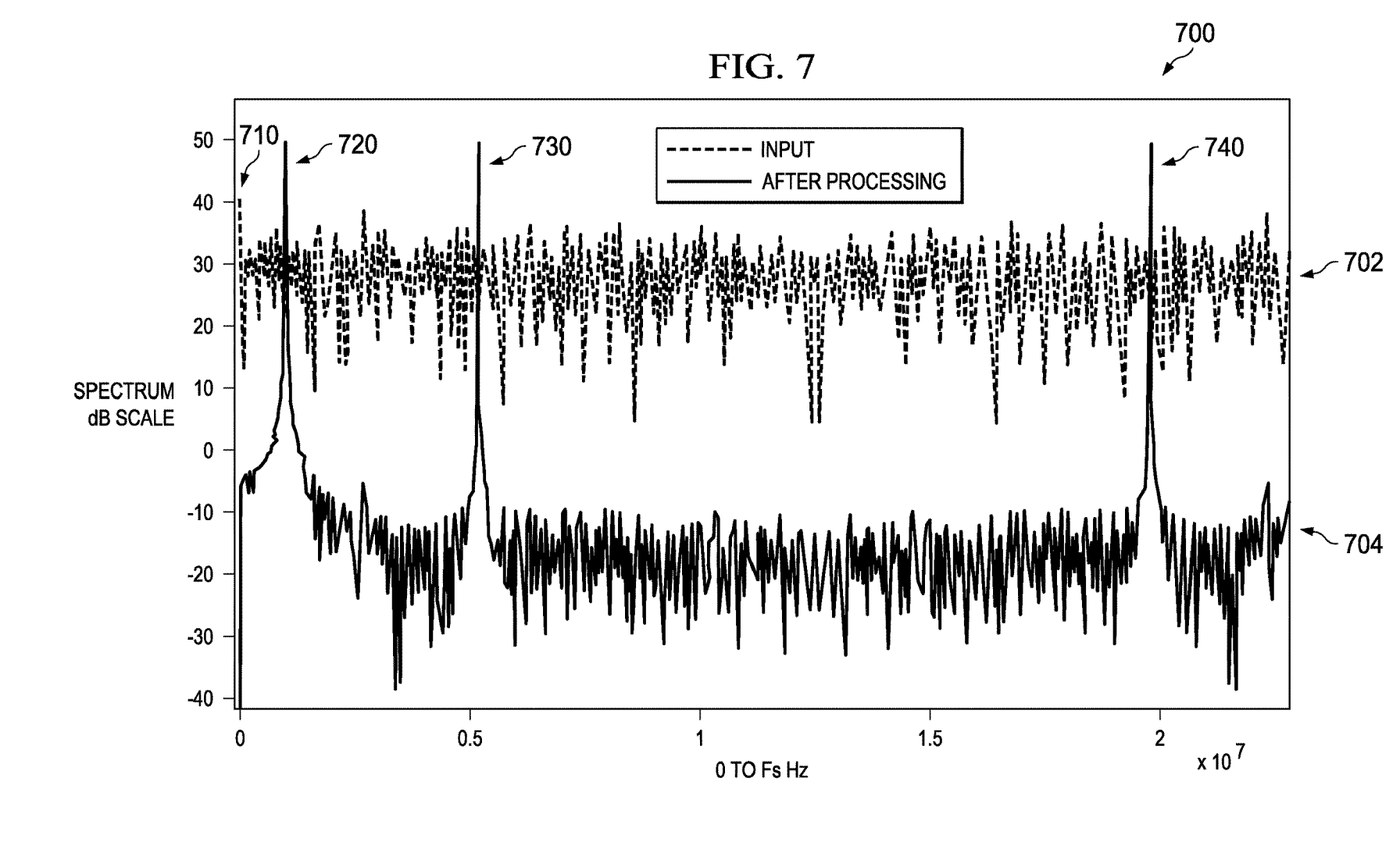
FIG. 7 is a frequency waveform diagram of an input baseband signal and a processed baseband signal of a simulation of a noise-mitigated FMCW radar system in accordance with embodiments of the disclosure.

FIG. 7 is a frequency waveform diagram of an input baseband signal and a processed baseband signal of a simulation of a noise-mitigated FMCW radar system in accordance with embodiments of the disclosure. Generally described, waveform diagram 700 includes an input baseband signal 702 and a processed (e.g., enhanced) baseband signal 704. The input baseband signal 702 includes the dominant interferer 710. After the dominant interferer 710 energy subsides, the input baseband signal has (for example) apparent noise levels predominantly around 35 dB (decibels) to 20 dB and an apparent average noise level around 30 dB.

After processing the input baseband signal 702 in accordance with the disclosed noise-mitigation techniques disclosed herein, the processed baseband signal 704 has noise levels substantially less than the noise levels of the input baseband signal 702. For example, the indications 720, 730, and 740 of objects of interest of the input baseband signal 702 each have a signal peak of around 50 dB. In contrast, the processed baseband signal 704 has noise levels having a maximum of around 0 (zero) dB, having apparent noise levels predominantly around −10 dB (decibels) to −25 dB, and having an apparent average noise level around −20 dB.

An example embodiment operates in accordance with values of various parameters. For example, the FMCW waveform frequency increases from 77 GHz to 81 GHz over a 40 micro-second duration (e.g., the "chirp" or "FMCW chirp") yielding a slope of 100 MHz/micro-second. The transmit output power has a power of approximately 10 through approximately 13 dBm, which results in a reflection or antenna coupling of approximately −10 dBm. The receiver noise figure is approximately 11 dB, which results in a thermal noise level of approximately −163 dBm/Hz. The receiver phase noise is approximately −147 dBc/Hz. The antenna coupling interference has a propagation delay of 100 pico-seconds, which results in an interference frequency (e.g., interferer signal) of 10 KHz at the ADC output. In the example embodiment, the signal shifter 284 is programmed with −10 KHz frequency shift and signal shifter 288 is programmed with a 10 KHz frequency shift. (Alternatively, the signal shifters 212 and 284 are each programmed with −5 KHz frequency shift and the signal shifter 288 is programmed with 10 KHz frequency shift.) The interference resulting from vehicle chassis reflections has a round trip propagation delay of 333 pico-second (when the chassis to radar antenna distance is 5 cm). Accordingly, an interference frequency of 33.33 KHz is determined at the ADC output.

In various embodiments, the antenna coupling might be more dominant (or less dominant) compared to the vehicle chassis reflections. The type of dominant interferers are typically known (and/or determined) during the design, manufacture and/or test of the radar apparatus on various vehicles (e.g., by a vehicle manufacture installing the disclosed system as original equipment manufacture). In various embodiments, the amplitude noise introduced in the LNA and PA circuits are more dominant (or less dominant) than the uncorrelated phase noise. Likewise, the magnitude of amplitude noise for a particular radar apparatus is typically known (and/or determined) during the design, manufacture and/or test of the radar apparatus.

Figure 8:
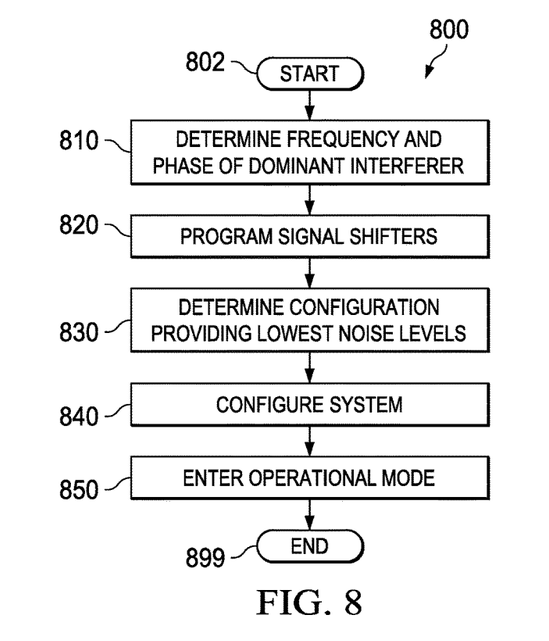
FIG. 8 is a process flow diagram using hardware-assisted signal shifting in accordance with embodiments of the invention.

FIG. 8 is a process flow diagram using hardware-assisted signal shifting in accordance with embodiments of the invention. Process flow begins in terminal 802 where process flow proceeds to operation 810. In operation 810, the frequency and phase of a dominant interferer is estimated.

For example, operation 810 is used in a calibration routine where all signal shifters 212, 284, 288 are initially bypassed. After the signal shifters 212, 284, 288 are bypassed, an FMCW chirp is transmitted and the return signal containing the dominant interferer is received. The estimator 282 processes the received return signal to determine (at the ADC output) the frequency and phase of the dominant interferer. The estimator 282 calculates the frequency and phase shift controls to apply to signal shifters 212, 284, 288 (e.g., based on the estimation of dominant interferer's frequency and phase). Program flow proceeds to step 820.

In operation 820, the signal shifters are programmed. For example, the estimator 282 programs the signal shifters 212, 284, 288, in such a way that the summation of shifts programmed on signal shifters 212 and 284 equals the negative of the frequency and phase of the dominant interferer, and in such a way that the summation of the shifts programmed on signal shifters 212 and 284 equals the negative of the shifts programmed on 288. Program flow proceeds to step 830.

In operation 830, a configuration that provides the lowest noise level is determined. For example, three configurations are tested wherein the multiplexer 292 configures the multiplexer 286 to: a) forward real only; b) forward imaginary only; and c) forward the complex input (both real and imaginary). For each such configuration, an FMCW chirp is transmitted and the return signal containing the dominant interferer is received. The FFT processor 290 processes the received signal (for each configuration) and estimates noise power level of the output of the signal shifter 288 to determine which configuration provides lowest noise power level. In various embodiments, operation 830 is not performed when the optimum configuration has been determined (for example) during the radar design and manufacture phase: the information (as well as signal shifting information) is embedded in the Multiplexer Controller 292. Program flow proceeds to step 840.

In operation 840, the system is configured using the information related to the optimum configuration. For example, the multiplexor controller 292 programs the multiplexor in the configuration determined in operation 830 (or in a design and/or manufacture phase). Program flow proceeds to step 850.

In operation 850, the operational mode is entered. For example, a plurality of FMCW chirps are transmitted and received, with the signal at the input of the FFT processor 290 repetitively processed by the FFT processor 290 to determine the presence, position and velocity of reflecting objects over time. The determined information can be used to perform safety functions (e.g., braking when a hazard exceeds a closing threshold), controlling robotic machines (e.g., piloting a drone or controlling a robot arm), and performing other such temporal-spatial control tasks. The radar FFT processor is optionally operable to generate such control commands in response to the determined information of the reflecting objects. Program flow proceeds to step 899 where the program flow terminates.

In an embodiment where the receiver does not include the (e.g., quadrature) mixer Q 263, IFA Q 265 and ADC Q 272 (e.g., as discussed above with respect to FIG. 2), the operations 820 and 830 are slightly modified. For example, a set of various values of signal shift are used to program a signal shifter in the transmitter (such that one configuration after another is evaluated). The FFT processor 290 is used to determine which configuration gives the lowest noise level at the output of ADC I 270. The configuration that provides the lowest noise level is selected as the optimum configuration and is forwarded as the selected optimum configuration to operation 840.

As discussed above the term "signal shifter 212" is used generically (e.g., for either or both of signal shifters 212 and 299) for convenience of explanation and to ease the understanding for the reader. In embodiments where the signal shifter 299 is used in place of signal shifter 212, (rather than, e.g., programming a certain frequency shift and phase shift to the signal shifter 212 while the signal shifter 299 is either absent or bypassed), the negative frequency shift and phase shift are programmed into the signal shifter 299 (with the signal shifter 212 either being absent or bypassed). The negative relationship between the frequency shift and phase shift values is used to configure the two signal shifters (e.g., because they are present in different paths leading to the receiver's mixer 260).

In various embodiments described herein, the circuits operating on ADC output (e.g., digital circuits) are illustrated as performing signal processing functions and as forwarding their output to the processor, which is explained as executing algorithms using firmware or software code. It is understood that the signal processing functions performed by the digital circuits can equivalently be coded in firmware or software that can be executed by the processor (e.g., before using the results of such processes as inputs to other processes). For example, each of the signal shifter 284, multiplexer 286, signal shifter 288 can be bypassed or be absent in the apparatus but techniques as disclosed herein can be achieved by arranging the processor to execute equivalent signal shifting, multiplexing etc. through firmware, software, or combinations thereof. As another example, portions of the frequency or phase shifting can be achieved in part with the digital circuits and the remaining part in the processor, (e.g., such that the same signal processing effects are substantially performed when the FMCW noise-mitigation system is viewed in totality). Also, the functions explained as being done by the processor (e.g., FFT) can equivalently be implemented in digital circuits. Moreover, the elements such as the signal shifter 284, multiplexer 286 and signal shifter 288 can be implemented as digital circuits, processor functions, and/or algorithms executed in the form of firmware or software.

In various embodiments described herein, the amplitude noise and phase noise skirts from the interferer are described as being predominantly 90-deg phase shifted with respect to each other (e.g., having a quadrature relationship to each other). Accordingly, either of the real and imaginary parts is used to suppress amplitude noise or phase noise. Other embodiments are possible, such as where, the phase shifting may be done such that the signal shifter output has the interferer signal at quadrature angles of 90 degrees, 180 degrees. 270 degrees, and the like, with respect to the interferer offset phase, instead of the (e.g., canonic) 0 degrees as discussed above for ease of explanation. In such cases, the choice of the real or imaginary portion of the shifted baseband signal for further radar processing is made with respect to the angle (e.g., quadrant) of the quadrature relationship. In view of the disclosure herein, the phase shifting can be performed such that the signal shifter output has the interferer signal at an arbitrarily different (e.g., from 90 degrees or other quadrature angle) but known interferer offset phase.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. An apparatus, comprising:
   a transmitter for transmitting a radar signal;
   a receiver for receiving a reflected radar signal, wherein:
      the reflected radar signal includes an interferer signal, that contains at least one of an associated amplitude noise skirt or phase noise skirt; and
      the receiver comprises a mixer for generating a baseband signal in response to the received reflected radar signal, the baseband signal contains a real portion and imaginary portion;
   a signal shifter in one of the transmitter and the receiver and coupled to the mixer, wherein the signal shifter is operable to;
      signal shift the interferer signal included in the reflected radar signal;
      suppress at least one of the amplitude noise skirt or phase noise skirt associated with the interferer signal; and
      in response to receiving the baseband signal from the mixer, signal shift the baseband signal.

2. The apparatus of claim 1, further comprising an estimator operable to process the received reflected radar signal and estimate a frequency and phase of the interferer signal.

3. The apparatus of claim 2, wherein the signal shifter suppresses the at least one of the amplitude noise or phase noise skirt associated with the interferer signal in response to the estimation of the frequency and phase of interferer signal.

4. The apparatus of claim 3, wherein the amplitude noise skirt associated with the interferer signal is included in substantially only a selected one of the real portion and the imaginary portion of the shifted baseband signal, wherein the phase noise skirt associated with the interferer signal is substantially included in the other of the selected one of the real portion and the imaginary portion of the shifted baseband signal.

5. The apparatus of claim 1, further comprising an FFT processor operable to:
   perform an FFT of the shifted baseband signal, to extract at least one of a conjugate even component or a conjugate odd component around an FFT bin corresponding to the interferer signal; and
   suppress at least one of amplitude noise skirt or phase noise skirt associated with the interferer signal.

6. The apparatus of claim 1, wherein the signal shifter is configured such that the interferer signal contained in the baseband signal has approximately zero frequency and such that at least one of the amplitude noise or phase noise associated with the interferer signal is suppressed.

7. The apparatus of claim 1, wherein the signal shifter configuration is determined based on relative levels of amplitude noise skirt and phase noise skirt associated with the interferer signal.

8. The apparatus of claim 1, further comprising a multiplexer coupled to the signal shifter that is operable to select one of the real and imaginary portions of the shifted baseband signal.

9. The apparatus of claim 8, wherein the multiplexer selection is determined based on relative noise levels in the real and imaginary portions of the shifted baseband signal.

10. A system, comprising:
    a transmit antenna for transmitting a radar signal received from a transmitter;
    a receiver antenna for receiving a reflected radar signal, wherein the reflected radar signal includes an interferer signal, wherein the interferer signal contains at least one of an associated amplitude noise skirt or phase noise skirt;
    a receiver for receiving the reflected radar signal from the receiver antenna;
    a mixer for generating a baseband signal in response to the received reflected radar signal by the receiver, wherein the baseband signal contains a real portion and imaginary portion; and
    a signal shifter arranged in one of the transmitter and the receiver, wherein the signal shifter is operable to:
       signal shift the interferer signal included in the reflected radar signal;
       suppress at least one of the amplitude noise skirt or phase noise skirt associated with the interferer signal; and
       in response to receiving the baseband signal from the mixer, signal shift the baseband signal.

11. The system of claim 10, wherein the interferer signal is the result of an electromagnetic coupling of the transmitted signal from the transmit antenna to the receive antenna.

12. The system of claim 10, wherein the interferer signal is a result of direct electromagnetic coupling of the transmitted signal from the transmit antenna to the receive antenna.

13. The system of claim 10, wherein the interferer signal is a result of a near object reflecting the transmitted radar signal.

14. The system of claim 13, wherein the near object is substantially stationary with respect to the receiver antenna.

15. The system of claim 10, wherein the receiver antenna is mounted to the chassis of a vehicle.

16. The system of claim 10, further comprising a chassis, wherein the interferer signal includes a reflection of the transmitted signal from the transmit antenna by the chassis to the receive antenna.

17. The system of claim 10, further comprising a multiplexer coupled to the signal shifter that is operable to select one of the real and imaginary portions of the shifted baseband signal.

18. A method, comprising:
    receiving a reflected radar signal, wherein the reflected radar signal includes an interferer signal, wherein the interferer signal contains at least one of an associated amplitude noise skirt or phase noise skirt;
    generating a baseband signal in response to the received reflected radar signal, wherein the baseband signal contains a real portion and imaginary portion;
    signal shifting the interferer signal, wherein the signal shifting includes frequency shifting;
    suppressing at least one of the amplitude noise skirt or phase noise skirt associated with the interferer signal in response to the signal shifting of the interferer signal; and
    signal shifting the baseband signal.

19. The method of claim 18, comprising transmitting a transmit signal, wherein the reflected radar signal is generated in response to the transmitted transmit signal.

20. The method of claim 19, wherein the interferer signal is the result of an electromagnetic coupling of the transmitted signal from a transmit antenna to a receive antenna.

21. The method of claim 18, comprising controlling a vehicle in response to the suppressed at least one of the amplitude noise skirt or phase noise skirt associated with the interferer signal.

* * * * *